United States Patent
Tarao et al.

(10) Patent No.: US 9,168,423 B2
(45) Date of Patent: *Oct. 27, 2015

(54) GOLF BALL

(71) Applicant: Dunlop Sports Co., Ltd., Kobe-shi, Hyogo (KP)

(72) Inventors: Toshiyuki Tarao, Kobe (JP); Kuniyasu Horiuchi, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 255 days.

This patent is subject to a terminal disclaimer.

(21) Appl. No.: 13/756,725

(22) Filed: Feb. 1, 2013

(65) Prior Publication Data

US 2013/0203524 A1    Aug. 8, 2013

(30) Foreign Application Priority Data

Feb. 3, 2012   (JP) .................................. 2012-21886
Jun. 15, 2012  (JP) ................................. 2012-136294

(51) Int. Cl.

| A63B 37/00 | (2006.01) |
|---|---|
| C09D 175/04 | (2006.01) |
| C08G 18/66 | (2006.01) |
| C08G 18/12 | (2006.01) |
| A63B 47/00 | (2006.01) |
| A63B 45/00 | (2006.01) |
| A63B 53/04 | (2015.01) |

(52) U.S. Cl.
CPC .......... *A63B 37/0023* (2013.01); *A63B 37/0003* (2013.01); *A63B 37/0022* (2013.10); *A63B 37/0031* (2013.01); *A63B 37/0077* (2013.01); *A63B 37/0096* (2013.01); *A63B 45/00* (2013.01); *A63B 47/008* (2013.01); *C08G 18/12* (2013.01); *C08G 18/6677* (2013.01); *C09D 175/04* (2013.01); *A63B 37/0018* (2013.01); *A63B 37/0021* (2013.01); *A63B 2053/0445* (2013.01); *A63B 2225/02* (2013.01)

(58) Field of Classification Search
None
See application file for complete search history.

(56) References Cited

U.S. PATENT DOCUMENTS

| 6,096,851 | A  * | 8/2000  | Maruoka et al. ................. 528/85 |
| 6,210,295 | B1 * | 4/2001  | Yoneyama .................... 473/378 |
| 6,454,667 | B1   | 9/2002  | Iwami |
| 2003/0176242 | A1 | 9/2003  | Mano |
| 2004/0254032 | A1* | 12/2004 | Lutz et al. ...................... 473/378 |
| 2011/0053708 | A1 | 3/2011  | Isoagawa et al. |
| 2011/0244989 | A1 | 10/2011 | Tarao et al. |
| 2013/0324318 | A1* | 12/2013 | Isogawa et al. ............... 473/373 |
| 2013/0331205 | A1* | 12/2013 | Tarao et al. .................... 473/378 |

FOREIGN PATENT DOCUMENTS

| JP | 2000-288125 A | 10/2000 |
| JP | 2003-265650 A | 9/2003 |
| JP | 2006-75209 A | 3/2006 |
| JP | 2006-75210 A | 3/2006 |
| JP | 2011-67595 A | 4/2011 |
| JP | 2011-217820 A | 11/2011 |
| WO | 99/23903 A1 | 5/1999 |

OTHER PUBLICATIONS

Machine translation of JP2006075210; no date.*
Extended European Search Report for European Application No. 13153252.5 dated Apr. 29, 2013.

* cited by examiner

*Primary Examiner* — David Buttner
(74) *Attorney, Agent, or Firm* — Birch, Stewart, Kolasch & Birch, LLP (57) ABSTRACT

An object of the present is to provide a golf ball having an increased spin rate on approach shots. Another object of the present invention is to provide a golf ball having a goof shot feeling on approach shots. The present invention provides a golf ball comprising a golf ball body and a paint film formed on a surface of the golf ball body, and having a coefficient of friction calculated using a contact force tester of 0.35 or more and 0.60 or less.

11 Claims, 7 Drawing Sheets

GOLF BALL

FIELD OF THE INVENTION

The present invention relates to an improvement of spin performance of a golf ball.

DESCRIPTION OF THE RELATED ART

A paint film is formed on a surface of the golf ball body. The improvement of the golf ball properties has been proposed by improving the paint film.

Japanese Patent Publication No. 2011-67595 A discloses a golf ball comprising a core, a cover situated on the external side of the core, and a paint layer situated on the external side of the cover, wherein the cover has a Shore D hardness of 61 or less, and the paint layer has a Martens hardness of 2.0 mgf/μm² or less. The golf ball is excellent in spin performance, stability of the spin rate, and durability of the paint layer.

Japanese Patent Publication No. 2011-217820 A discloses a golf ball comprising a golf ball body and a paint film formed on a surface of the golf ball body, wherein the paint film has a Martens hardness of 2.0 mgf/μm² or less, and a ratio (50% modulus/10% modulus) of 50% modulus to 10% modulus of 1.6 or more. The golf ball has a high spin rate on approach shots under the wet condition and rough condition.

Japanese Patent Publications No. 2006-75209 A and 2006-75210 A propose a golf ball that stops quickly on the green by increasing the launch angle of the golf ball. Japanese Patent Publication No. 2006-75209 A discloses a golf ball comprising a golf ball body and a paint film covering the golf ball body, wherein a resin component constituting the paint film is cured by a polyamide type curing agent and the golf ball has a static friction coefficient of 0.22 or less. Japanese Patent Publication No. 2006-75210 A discloses a golf ball comprising a golf ball body and a paint film covering the golf ball body, wherein the paint film contains a metal particle.

Japanese Patent Publication No. 2000-288125 A discloses a golf ball having an improved abrasion resistance and durability. The golf ball having an excellent durability comprises a core, a cover, and at least one paint layer formed on the cover, wherein the cover has a Shore D hardness of 50 to 65 and a flexural modulus of 1,000 to 2,000 kgf/cm², and at least outermost layer of the paint has a 10% modulus of 5 to 50 kgf/cm².

Japanese Patent Publication No. 2003-265650 A proposes a golf ball having an improved spin retention without sacrificing the requirements for the paint film. Japanese Patent Publication No. 2003-265650 A discloses a golf ball comprising a core, at least one cover layer covering the core, and a paint film formed on an outer surface of the cover, wherein a thickness of the paint film is 25 μm to 125 μm, a 50% modulus of the paint film is 5 MPa to 50 MPa, and a value R expressed by an equation (1) is from 0.01 to 0.5:

$$R=PL/CL/1,000 \quad (1)$$

where CL (mm) represents a thickness of an outermost layer of the cover, and PL (μm) represents a thickness of the paint film.

SUMMARY OF THE INVENTION

An object of the present invention is to provide a golf ball having an increased spin rate on approach shots. Another object of the present invention is to provide a golf ball with a good shot feeling on approach shots.

The golf ball of the present invention, which has solved the above problems, comprises a golf ball body and a paint film formed on a surface of the golf ball body, and has a coefficient of friction calculated using a contact force tester of 0.35 or more and 0.60 or less.

According to the present invention, it is possible to provide a golf ball having a high spin rate and a good shot feeling on approach shots.

DESCRIPTION OF THE PREFERRED EMBODIMENT

The present invention provides a golf ball comprising a golf ball body and a paint film formed on a surface of the golf ball body, and having a coefficient of friction calculated using a contact force tester of 0.35 or more and 0.60 or less.

(1) Measurement of Coefficient of Friction

In the present invention, the coefficient of the friction calculated using the contact force tester is a coefficient of friction between a golf ball and a collisional plate when the golf ball collides with the collisional plate disposed inclined at a predetermined angle to a flying direction of the golf ball. By using the contact force tester, a time function Fn(t) of contact force in the direction perpendicular to the collisional plate and a time function Ft(t) of contact force in the direction parallel to the collisional plate are concurrently measured; and a maximum value of a time function M(t) which is a ratio of Ft(t) to Fn(t) represented by the following equation is defined as a coefficient of friction.

$$M(t)=Ft(t)/Fn(t)$$

Figure 1:
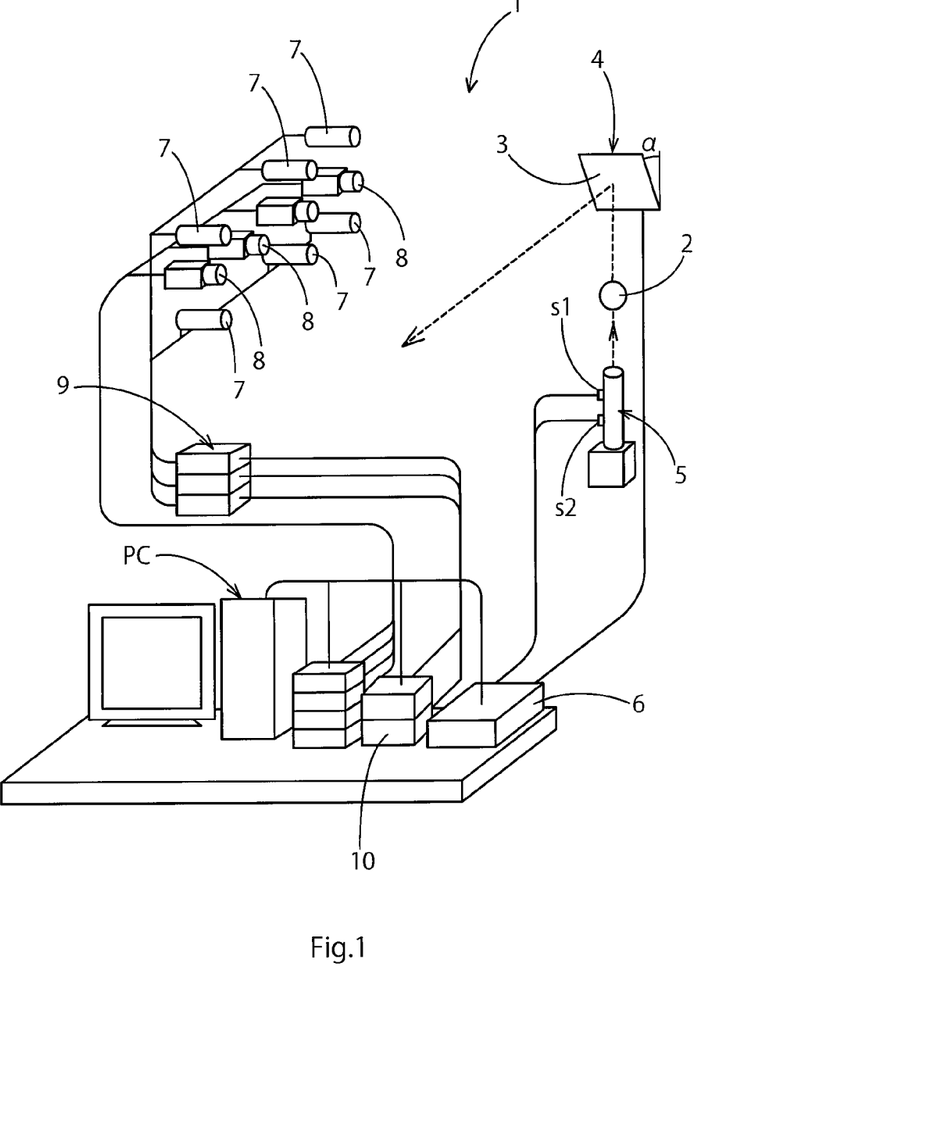
FIG. 1 is a schematic view of a contact force tester used in the present invention.
Figure 2:
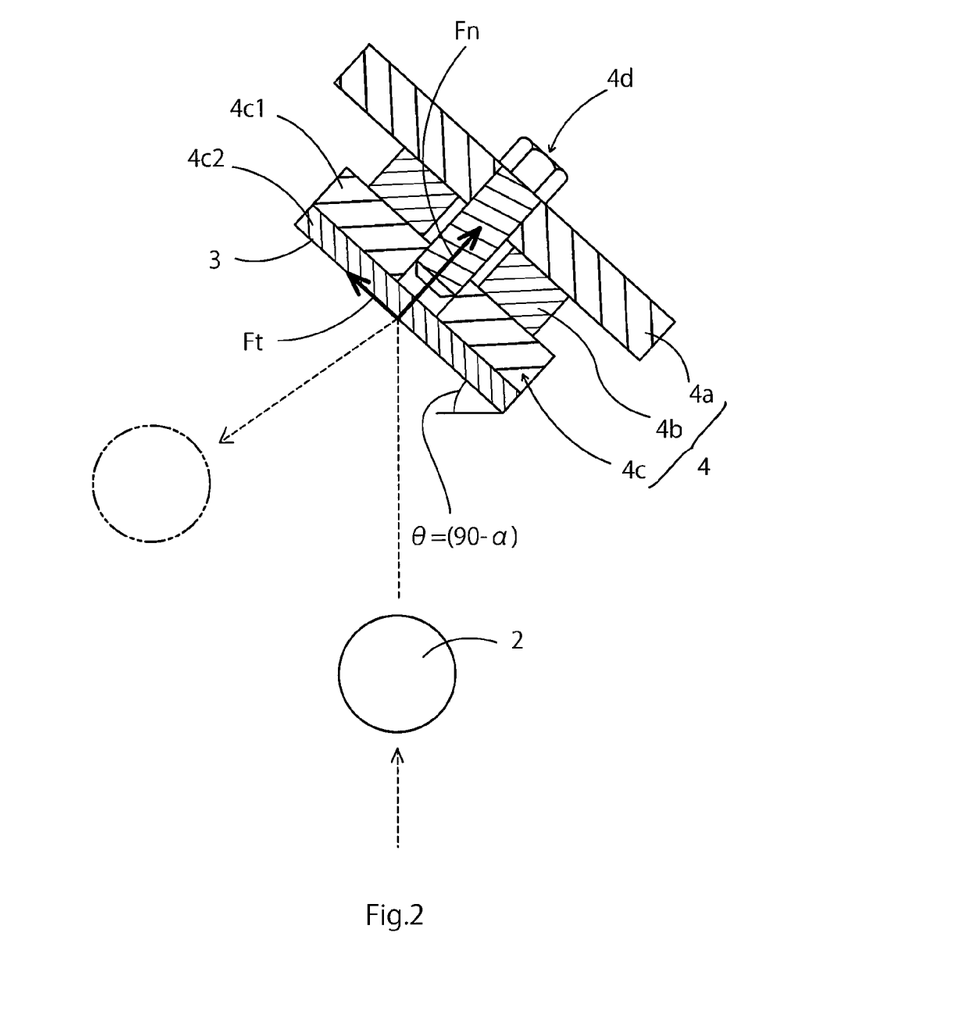
FIG. 2 is a partially enlarged cross-sectional view of a collisional plate of the contact force tester.

The method of calculating the friction coefficient of the present invention will be described based on FIGS. 1 to 3. FIG. 1 is a contact force tester for measuring a coefficient of friction and spin rate. FIG. 2 is an enlarged cross-sectional view of a collisional plate 4 that a golf ball collides with.

The contact force tester 1 makes pseudo conditions of hitting a golf ball with a club face, and enables to measure various forces at that time. The contact force tester 1 includes a launcher 5 that launches a golf ball 2 in an upward and perpendicular direction and a collisional plate 4 that is positioned on the upper side of the launched golf ball 2. The collisional plate 4 has a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may fall within the range of about 10 m/s to 50 m/s. In the present invention, in light of the head speed of approach shots, the initial velocity is set to 19 m/s.

The desired value of the initial velocity of the golf ball 2 is set by the volume of a controller 6. Based on a distance between a first sensor S1 and a second sensor S2 which are provided in the launcher 5 and a time difference between interrupting these sensors, the controller 6 calculates the actually measured value of the initial velocity of the golf ball 2, and outputs the value to a computer device PC.

FIG. 2 shows a partially enlarged cross-sectional view of the collisional plate 4. The collisional plate 4 can incline the striking face 3 at a predetermined angle α to the launching direction (flying direction) of the golf ball 2. In the present invention, an angle θ that is obtained by subtracting the angle α from 90 degree is defined as a collisional angle. This collisional angle θ corresponds to a loft angle of a club face (not shown) in an actual swing. Further, in consideration of the loft angle of a golf club, the collisional angle can be set to more than one value (for example, 15°, 20°, 35°) in the range from 10° to 90°, and the measurement of the contact force, which will be described later, can be conducted at each angle. In the present invention, the collisional angle θ is made 55° in order to recreate the spin rate on approach shots.

The collisional plate 4 has a base plate 4a formed of a metal plate material, a superficial plate 4c with the striking face 3, and a pressure sensor 4b interposed therebetween, and they are fixed to one another with a bolt 4d integrally. The base plate 4a may be formed of any material without particular limitation, as long as it has a predetermined strength and rigidity, but preferably formed of steel. The base plate 4a preferably has a thickness in a range from 5.0 mm to 20.0 mm. A model number of the main bolt 4d is, for example, M10 according to Japanese Industrial Standards (WS).

As the pressure sensor 4b, for example, a 3-component force sensor is preferably used. The sensor 4b measures, at least, a perpendicular force Fn in a direction perpendicular to the striking face 3, and a shear force Ft in a direction parallel to the striking face 3 (the direction of the sole side toward the crown side in a club face) as time-series data. The measurement of the force is conducted by connecting a charge amplifier to the pressure sensor 4b.

As the pressure sensor 4b, a variety of products may be used, for example, a 3-component force sensor (model 9067) manufactured by Kistler Instrument Corp is preferably used. This sensor enables to measure force components in a parallel direction, a Y direction and a perpendicular direction. Although not illustrated, the measurement of the pressure is conducted with a charge amplifier (model 5011B of Kistler Instrument Corp.) connected to the pressure sensor 4b. The pressure sensor 4b is formed in its center with a through-hole through which the main bolt 4d is inserted to integrally fix the pressure sensor 4b with the base plate 4a.

The superficial plate 4c is composed of the main body 4c1 and a superficial material 4c2 which is disposed outside of the main body 4c1 to provide the striking face 3 and has an area which is large enough to collide with the golf ball 2. These are firmly fixed with a bolt which is not illustrated in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed of any materials without limitation, but typically of stainless steel (SUS-630). The thickness of the main body 4c1 is typically in the range from 10 mm to 20 mm. Also, the main body 4c1 may have a planner shape which is substantially the same with that of the pressure sensor 4b, such as a square 40 mm to 60 mm on a side. Into the main body 4c1, one end of the main bolt 4d is screwed. As a result, the pressure sensor 4b is interposed between the base plate 4a and the main body 4c1, and the position thereof is fixed.

As to the superficial material 4c2 which provides the striking face 3 of the collisional plate 4, various materials, planner shapes and surface structures may be adopted, however, the superficial material 4c2 is preferably formed of the same material as the face (not shown) of the golf club head which is subject to an analysis. In the present invention, in view of evaluation of model of approach shots, stainless SUS-431 which is the same material as the head material of CG-15 manufactured by Cleveland Golf is used as the superficial material 4c2. The thickness of the superficial material 4c2 may be arbitrarily changed, for example, within the range of 1.0 mm to 5.0 mm. The planner shape of the superficial material 4c2 is substantially the same with that of the main body 4c1, for example, a square 40 mm to 60 mm on a side.

The contact force tester 1 includes a strobe device 7 and a high speed type camera device 8 which can take a photograph of the collision between the golf ball 2 and the striking face 3 and the golf ball 2 that rebounds from the striking face 3. The strobe device 7 is connected to a strobe power 9. The camera device 8 is connected to a camera power 10 via a capacitor box. The imaged data is memorized in the computer device PC. By including these devices, a slipping velocity at the time of the collision between the golf ball 2 and the striking face 3 which will be explained later, a contact area, and an initial launch speed, a flying angle (launch angle) and a backspin rate of a golf ball can be measured.

Figure 3:
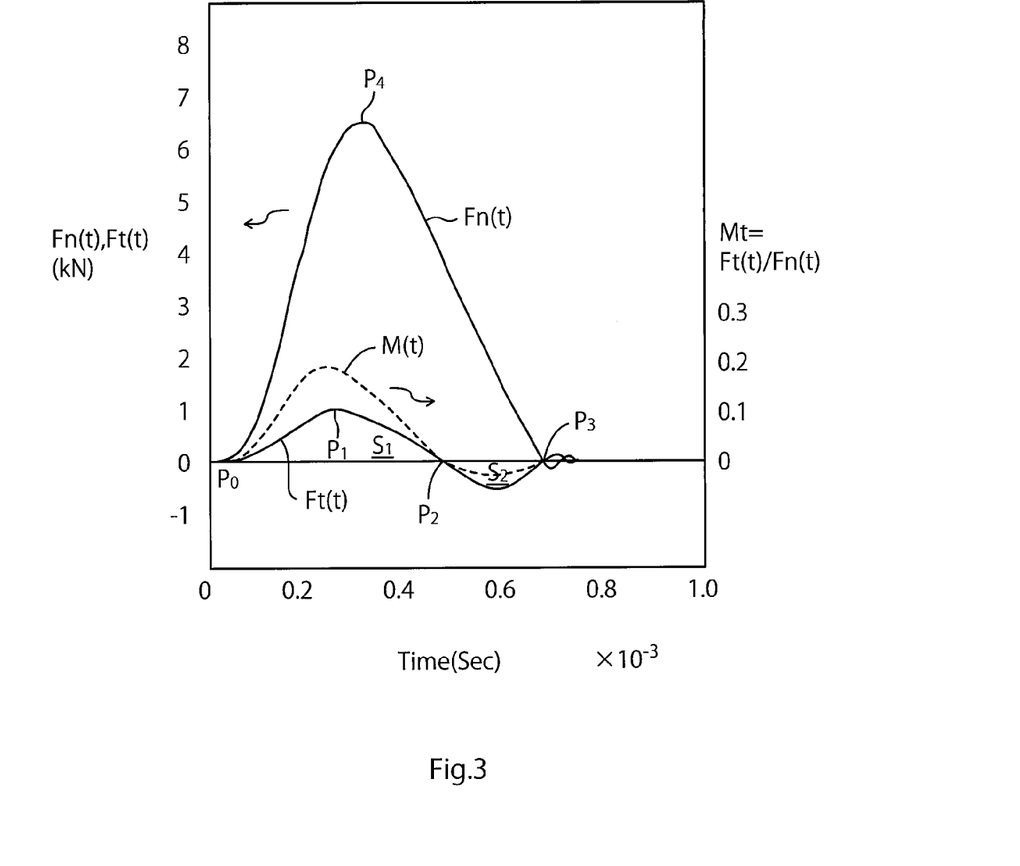
FIG. 3 is a graph illustrating Ft(t), Fn(t), and M(t)

FIG. 3 shows the time history of the perpendicular force Fn and the shear force Ft applied to the striking face 3 at the time of the collision by the golf ball 2 measured by the contact force tester 1.

FIG. 3 is a graph illustrating an example of Fn(t) and Ft(t) measured by the tester shown in FIGS. 1 and 2. In FIG. 3, a point P0 represents a position where the pressure sensor 4b starts sensing force, and generally corresponds to the point at which the collisional plate 3 and the golf ball 2 come into collision with each other. Fn(t) which is a perpendicular component of the contact force gradually increases from the point P0, peaks at a point P4, comes down therefrom to reach zero at a point P3. The point P3 represents a point where the pressure sensor 4b no longer senses force, and generally corresponds to the point where the golf ball 2 leaves the collisional plate 3.

On the other hand, a value of Ft(t) which is a parallel component of the contact force to the collisional plate (i.e., shear strength) increases with time from the point P0, peaks at the point P1, then gradually decreases to zero at the point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes positive values within the area surrounded by the curve of Ft(t) and the time axis represents impulse where shear strength is positive. On the other hand, an area S2 of the region where Ft(t) takes negative values within the area surrounded by the curve of Ft(t) and the time axis represents impulse where the shear strength is negative. Impulse S1 acts in such a direction that promotes back spin. Here, impulse S1 takes a large value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction is preferably 0.35 or more, more preferably 0.37 or more, even more preferably 0.39 or more, and is preferably 0.60 or less, more preferably 0.56 or less, even more preferably 0.54 or less. If the coefficient of friction is within the above range, a spin rate on approach shots becomes good.

The golf ball of the present invention includes a golf ball body and a paint film formed on a surface of the golf ball body. In light of obtaining a golf ball having a coefficient of friction calculated using the contact force tester of 0.35 or more and 0.60 or less, a base resin constituting the paint film preferably includes a polyurethane obtained by a reaction between a polyol and two or more polyisocyanates. The coefficient of friction can be controlled by choosing appropriately kinds and mixing ratio of the poly and the polyisocyanates.

Examples of the polyol include a low molecular weight polyol having a molecular weight of less than 500 and a high molecular weight polyol having an average molecular weight of 500 or more. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-ε-caprolactone (PCL); a polycarbonate polyol such as polyhexamethylene carbonate; a urethane polyol; and an acrylic polyol. The above polyol may be used solely or in combination of at least two of them.

In the present invention, as the polyol component, preferably used is a urethane polyol. The urethane polyol is a compound having a plurality of urethane bonds in the molecule thereof, and having at least two hydroxyl groups in the molecule thereof. The urethane polyol is, for example, a hydroxyl group terminated urethane prepolymer, which is obtained by a reaction between a polyisocyanate component and a polyol component, under a condition that the hydroxyl groups of the polyol component is excessive to the isocyanate groups of the polyisocyanate component.

The polyisocyanate component constituting the urethane polyol is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}MDI$), hydrogenated xylylenediisocyanate ($H_6XDI$), hexamethylene diisocyanate (HDI), isophorone diisocyanate (IPDI), and norbornene diisocyanate (NBDI). The polyisocyanate may be used solely or in combination of at least two of them.

As the polyol component constituting the urethane polyol, the compounds exemplified as the polyol can be used. In the present invention, preferred is the polyol component including a triol component and diol component as the polyol component constituting the urethane polyol. The triol component preferably includes trimethylolpropane. The diol component preferably includes polytetramethylene ether glycol. A mixing ratio (triol component/diol component) of the triol component to the diol component is preferably 0.2 or more, more preferably 0.5 or more, and is preferably 6.0 or less, more preferably 5.0 or less in a mass ratio.

The acrylic polyol is an acrylic resin or acrylic polymer having a plurality of hydroxyl groups, and is obtained, for example, by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl (meth)acrylate, 2-hydroxypropyl (meth)acrylate, 2-hydroxybutyl (meth)acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include: (meth)acrylic unsaturated carboxylic acids such as (meth)acrylic acid; (meth)acrylic acid ester such as methyl(meth)acrylate, ethyl(meth)acrylate, propyl (meth)acrylate, isopropyl (meth)acrylate, butyl (meth)acrylate, isobutyl (meth)acrylate, pentyl (meth)acrylate, hexyl (meth)acrylate, 2-ethylhexyl (meth)acrylate, cyclohexyl (meth)acrylate, octyl (meth)acrylate, and decyl (meth)acrylate; and another (meth)acrylic monomer such as (meth)acrylonitrile, and (meth)acrylamide. These (meth)acrylic monomers having no hydroxyl group may be used individually or in combination of two or more of them. In the present invention, the term "(meth)acrylic" means "acrylic" and/or "methacrylic."

Further, in addition to the (meth)acrylic monomer, the acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and a-methyl styrene; and ethylenically unsaturated carboxylic acids such as maleic acid and itaconic acid. These other monomer components may be used individually or in combination of two or more of them.

The hydroxyl value of the polyol is preferably 10 mg KOH/g or more, and more preferably 15 mg KOH/g or more, and even more preferably 20 mg KOH/g or more, and is preferably 400 mg KOH/g or less, preferably 300 mg KOH/g or less, more preferably 200 mg KOH/g or less, even more preferably 170 mg KOH/g or less, and most preferably 160 mg KOH/g or less. If the hydroxyl value of the polyol component falls within the above range, the adhesion of the paint film to the golf ball body improves. In the present invention, the hydroxyl value can be measured by using, for example, an acetylization method, in accordance with JIS K 1557-1.

The weight average molecular weight of the polyol is preferably 500 or more, and more preferably 550 or more, and even more preferably 600 or more, and is preferably 150,000 or less, and more preferably 140,000 or less, and even more preferably 130,000 or less. If the weight average molecular weight of the polyol component falls within the above range, the water-resistance and impact-resistance of the paint film can be enhanced. The weight average molecular weight of the polyol component can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K.K.).

Specific examples of the polyol component are 121 B available from Wayaku Paint Co.; Nippollan 800, Nippollan 1100 available from Nippon Polyurethane Industry Co., Ltd; Burnock D6-627, Burnock D8-436, Burnock D8-973, Burnock11-408 available from DIC Corporation; Desmophen 650 MPA, Desmophen 670, Desmophen 1150, Desmophen A160X available from Sumika Bayer Urethane Co., Ltd; Hariacron 2000, Hariacron 8500H available from Harima Chemicals, Inc; Polin #950, Polin #860 available from Shinto Paint Co., Ltd.

Next, two or more polyisocyanates will be described. As the polyisocyanate, for example, compounds having at least two isocyanate groups can be exemplified.

The polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate(TMXDI) and para-phenylene diisocyanate (PPDI); and an alicyclic or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI) and derivatives thereof.

Examples of the derivative of the polyisocyanate include: an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. One example of the allophanate-modified product is a trifunctional polyisocyanate which is obtained by further reacting a diisocyanate with a urethane bond formed through a reaction between a diisocyanate and a low molecular weight diol. The biuret-modified product is, for example, a trifunctional polyisocyanate which is represented by the following formula (1). The isocyanurate of diisocyanate is, for example, a trifunctional polyisocyanate which is represented by the following formula (2). In the formulae (1) and (2), R represents a residue where isocyanate groups are removed from the diisocyanate.

In the present invention, as the polyisocyanate, preferably used are a derivative of hexamethylene diisocyanate and a derivative of isophorone diisocyanate. As the derivative of hexamethylene diisocyanate, preferably used are a biuret-modified product and an isocyanurate of hexamethylene diisocyanate. As the derivative of isophorone diisocyanate, preferably used is an isocyanurate of isophorone diisocyanate.

A mixing ratio (HDI derivative/IPDI derivative) of the derivative of hexamethylene diisocyanate to the derivative of isophorone diisocyanate is preferably 80/20 to 50/50, and more preferably 65/35 to 55/45 in a mass ratio. A mixing ratio (biuret-modified product/isocyanurate) of the biuret-modified product of hexamethylene diisocyanate to the isocyanurate of hexamethylene diisocyanate is preferably 20/40 to 40/20, and more preferably 25/35 to 35/25 in a mass ratio.

The polyisocyanate preferably has an isocyanate content (NCO %) of 0.5 mass % or more, more preferably 1 mass % or more, even more preferably 2 mass % or more, and preferably has an isocyanate content (NCO %) of 45 mass % or less, more preferably 40 mass % or less, even more preferably 35 mass % or less. The isocyanate content (NCO %) of the polyisocyanate can be defined by the following expression.

NCO(%)=100×[mole number of an isocyanate group in the polyisocyanate×42(molecular weight of NCO)]/[total mass (g) of the polyisocyanate]

Specific examples of the polyisocyanate are Burnock D-800, Burnock DN-950, Burnock DN-955 available from DIC corporation; Desmodur N75MPA/X, Desmodur N3300, Desmodur L75 (C), Sumidur E21-1 available from Sumika Bayer Urethane CO., Ltd; Coronate HX, Coronate HK available from Nippon Polyurethane Industry Co., Ltd; Duranate 24A-100, Duranate 21S-75E, Duranate TPA-100, Durante TKA-100 available from Asahi Kasei Corporation; Vestanat T1890 available from Degussa.

In a reaction between the polyol and the two or more polyisocyanates, the molar ratio (NCO/OH) of the isocyanate group (NCO) of the polyisocyanate to the hydroxyl group (OH) of the polyol is preferably 0.1 or more, more preferably 0.2 or more. If the molar ratio (NCO/OH) is less than 0.1, the curing reaction may become insufficient. Further, if the molar ratio (NCO/OH) is too large, the amount of the isocyanate groups is excessive, and the appearance of the obtained paint film may deteriorate as well as the obtained paint film may be hard and fragile. Thus, the molar ratio (NOC/OH) is preferably 1.0 or less, more preferably 0.9 or less. The reason why the appearance of the obtained paint film deteriorates if the amount of the isocyanate group is excessive is that an excessive amount of isocyanate groups in the paint may promote a reaction between the moisture in the air and the isocyanate groups, thereby generating a lot of carbon dioxide gas.

The paint film of the golf ball of the present invention is preferably formed from a paint containing a polyol and two or more polyisocyanates. Preferable example of the paint is a so-called two-component curing type paint containing the polyol as a base material and the two or more polyisocyanates as a curing agent. The paint may be either a waterborne paint mainly containing water as a dispersion medium or a solvent-base paint mainly containing an organic solvent as a dispersion medium. In the case of the solvent-base paint, preferable solvents are, for example, toluene, isopropyl alcohol, xylene, methyl ethyl ketone, methyl isobutyl ketone, ethyleneglycol monomethyl ether, ethyl benzene, propyleneglycol monomethyl ether, isobutyl alcohol, and ethyl acetate.

The paint may further contain additives such as a filler, an ultraviolet absorber, an antioxidant, a light stabilizer, a fluorescent brightener, an anti-blocking agent, a leveling agent, a slip agent and a viscosity modifier, which are generally contained in the paint for a golf ball, where necessary.

Next, the applying method of the curing type polyurethane paint used in the present invention will be described. The method of applying the curing type polyurethane paint is not limited, and includes conventional methods, for example, spray coating method or electrostatic coating method.

In the case of applying the paint with the air gun, the polyol component and the polyisocyanate component may be fed with the respective pumps and continuously mixed through the line mixer located in the stream line just before the air gun, and the obtained mixture can be air-sprayed. Alternatively, the polyol component and the polyisocyanate component can be air-sprayed respectively with the spray gun having the device for controlling the mixing ratio thereof. The paint application may be conducted by spraying the paint one time or overspraying the paint multiple times.

The curing type polyurethane paint applied to the golf ball body is dried at the temperature ranging from 30° C. to 70° C. for 1 hour to 24 hours to form a paint film.

The thickness of the paint film after drying is preferably, without limitation, 5 µm or more, more preferably 6 µm or more, even more preferably 10 µm or more, most preferably 15 µm or more. If the thickness is less than 5 µm, the paint film is likely to wear off due to the continued use. Further, thickening the paint film increase the spin rate on approach shots under the wet condition. The thickness of the paint film is preferably 50 µm or less, more preferably 40 µm or less, more preferably less than 30 µm, even more preferably less than 28 µm, and most preferably less than 25 µm. If the thickness is more than 50 µm, the effect of the dimples is lowered, and thus the flying performance of the golf ball tends to be low. The thickness of the paint film can be measured, for example, by observing a cross section of the golf ball using a microscope (VHX-1000 available from Keyence Corporation). In the case of overpainting the paint, a total thickness of the whole paint films formed preferably falls within the above range.

In the present invention, the paint film formed on a surface of the golf ball body preferably has a martens hardness of 4.0 mgf/µm$^2$ or less, more preferably 3.5 mgf/µm$^2$ or less, even more preferably 3.0 mgf/µm$^2$ or less. The martens hardness can be measured by a later described method and is suitable for measuring a hardness in a micro region. If the martens hardness is 4.0 mgf/µm$^2$ or less, the paint film is soft enough to produce a high spin rate. There is no lower limit on the martens hardness, but the martens hardness is preferably 0.01 mgf/µm$^2$ or more. If the martens hardness is too low, the paint film is too soft and tacky.

The paint film preferably has a 100% elastic modulus of 240 kgf/cm$^2$ or less, more preferably 210 kgf/cm$^2$ or less. If the 100% elastic modulus is 240 kgf/cm$^2$ or less, the paint film is soft and the spin rate on approach shots increases. There is no lower limit on the 100% elastic modulus, but the 100% elastic modulus is preferably 15 kgf/cm$^2$ or more, more preferably 20 kgf/cm$^2$ or more. If the 100% elastic modulus is too low, the paint film becomes too soft and tacky. Thus, the feeling becomes bad.

The paint film preferably has a 50% elastic modulus of 10 kgf/cm$^2$ or more, more preferably 14 kgf/cm$^2$ or more. Making the paint film have the 50% elastic modulus of 10 kgf/cm$^2$ or more increase the spin rate on approach shots. There is no upper limit on the 50% elastic modulus, but the 50% elastic modulus is preferably 180 kgf/cm$^2$ or less, more preferably 150 kgf/cm$^2$ or less. If the 50% elastic modulus is too high, the paint film becomes too hard and the spin rate becomes low.

The paint film preferably has a 10% elastic modulus of 160 kgf/cm$^2$ or less, more preferably 130 kgf/cm$^2$ or less. If the 10% elastic modulus is 160 kgf/cm$^2$ or less, the paint film is soft and the spin rate on approach shots increases. There is no lower limit on the 10% elastic modulus, but the 10% elastic modulus is preferably 5 kgf/cm$^2$ or more, more preferably 10 kgf/cm$^2$ or more. If the 10% modulus is too low, the paint film becomes too soft and tacky. Thus, the feeling becomes bad.

The golf ball construction is not limited, as long as the golf ball of the present invention comprises a golf ball body and a paint film formed on a surface of the golf ball body. The golf ball body of the present invention may be a one-piece golf ball, a two-piece golf ball, a multi-piece golf ball including a three-piece golf ball, or a wound golf ball. The present invention can be applied appropriately to any one of the above golf balls.

The golf ball of the present invention is preferably a golf ball that comprises a core and a cover covering the core. In this case, the cover preferably has a hardness of 61 or less, more preferably 55 or less, even more preferably 45 or less, most preferably 40 or less in Shore D hardness. If the cover has a hardness of 61 or less in Shore D hardness, the spin rate becomes higher. There is no lower limit on the hardness of the cover, but the cover preferably has a hardness of 20 or more, more preferably 25 or more, even more preferably 30 or more in Shore D hardness. The hardness of the cover is a slab hardness obtained by measuring the cover composition molded into a sheet form.

Examples of the cover material constituting the cover include, various resins such as an ionomer resin, a polyester resin, polyurethane resins like a thermoplastic urethane resin and a thermosetting urethane resin, and a polyamide resin; and various thermoplastic elastomers such as a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark) (e.g. "Elastollan XNY97A")" available from BASF Japan Ltd, and a thermoplastic styrene elastomers having a trade name "Rabalon (registered trademark)" and a thermoplastic polyester elastomer having a trade name "Primalloy" commercially available from Mitsubishi Chemical Corporation, and the like. These cover materials may be used solely or in combination of two or more types thereof.

The cover in the present invention may contain a pigment component such as a white pigment (for example, titanium oxide), a blue pigment, a red pigment, or the like, a specific gravity adjusting agent such as calcium carbonate, barium sulfate, or the like, a dispersant, an antioxidant, an ultraviolet absorber, a light stabilizer, a fluorescent material or a fluorescent brightener, or the like, as long as they do not impair the performance of the cover.

An embodiment for molding a cover from a cover composition is not particularly limited, and includes an embodiment which comprises injection molding the cover composition directly onto the core, or an embodiment which comprises molding the cover composition into a hollow-shell, covering the core with a plurality of the hollow-shells and subjecting the core with a plurality of the hollow shells to the compression-molding (preferably an embodiment which comprises molding the cover composition into a half hollow-shell, covering the core with the two half hollow-shells, and subjecting the core with the two half hollow-shells to the compression-molding). After the cover is molded, the mold is opened and the golf ball body is taken out from the mold, and as necessary, the golf ball body is preferably subjected to surface treatments such as deburring, cleaning, and sandblast. If desired, a mark may be formed.

Figure 4:
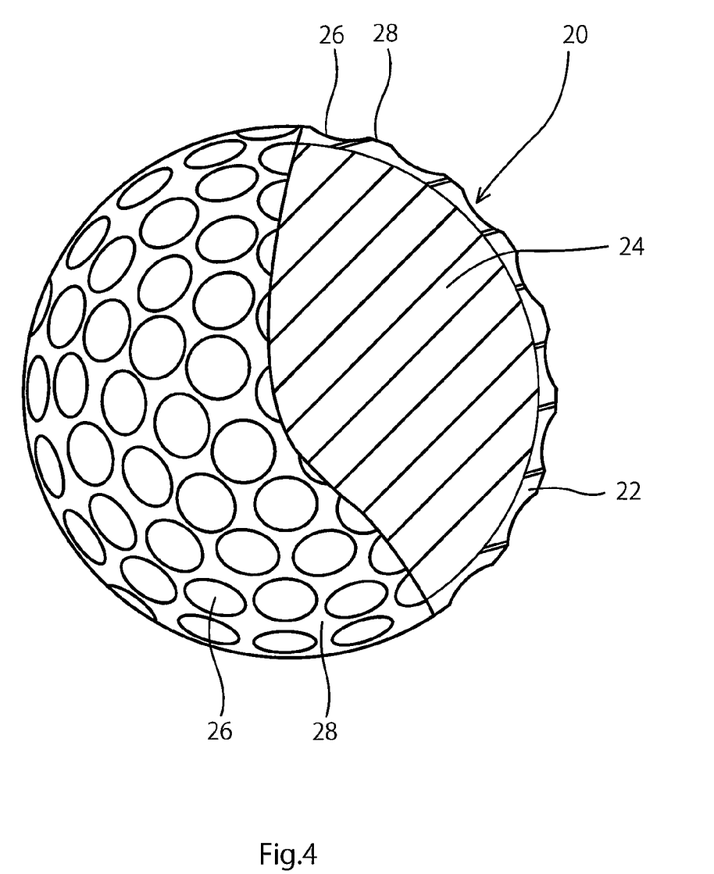
FIG. 4 is a partially cutaway view showing the golf ball according to the preferable embodiment of the present invention.

FIG. 4 is a partially cutaway view showing a golf ball 20 according to the preferable embodiment of the present invention. The golf ball 20 has a spherical core 24 and a cover 22 covering the spherical core 24. On the surface of the cover 22, a large number of dimples 26 are formed. Of the surface of the golf ball 20, a part other than the dimples 26 is called a land 28. The golf ball 20 includes a paint layer and a mark layer on the external side of the cover 22 although these layers are not shown in the drawing.

The total number of the dimples formed on the cover is preferably 200 or more and 500 or less. If the total number of the dimple is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, polygonal shapes such as roughly triangular shape, roughly quadrangular shape, roughly pentagonal shape, and roughly hexagonal shape, another irregular shape. The shape of the dimples is employed solely or in combination at least two of them.

In the present invention, the ratio of the sum of the areas of dimples to the surface area of a phantom sphere of a golf ball is referred to as an occupation ratio. The phantom sphere is a golf ball (spherical body) when assuming that there is no dimples on the surface thereof. In the golf ball of the present invention, the occupation ratio of the dimple is preferably 60% or more, more preferably 63% or more, even more preferably 66% or more, and is preferably 90% or less, more preferably 87% or less, even more preferably 84% or less. If the occupation ratio is too high, the contribution of the paint film to the coefficient of friction becomes small. Further, if the occupation ratio is too low, the flight performance is lowered.

The term "an area of the dimples" refers to the area enclosed in the periphery (edge) of the dimples when observing the central point of the golf ball from infinity. In the case of the circular dimple, the area of the dimple S is expressed by the following formula:

$$S=(Di/2)^2 \cdot \pi \text{ (Di: diameter of the dimple)}$$

The golf ball preferably has a diameter ranging from 40 mm to 45 mm. In light of satisfying a regulation of US Golf Association (USGA), the diameter is preferably 42.67 mm or more. In light of prevention of the air resistance, the diameter is preferably 44 mm or less, and more preferably 42.80 mm or less. The golf ball preferably has a mass of 40 g or more and 50 g or less. In light of obtaining greater inertia, the golf ball more preferably has a mass of 44 g or more, and even more preferably 45.00 g or more. In light of satisfying a regulation of USGA, the golf ball preferably has a mass of 45.93 g or less.

Next, the core used for the wound golf ball, two-piece golf ball, multi-piece golf ball, and the one-piece golf ball body will be explained.

As the core or the one-piece golf ball body, a conventionally known rubber composition (hereinafter simply referred to as "core rubber composition" occasionally) may be employed, and they can be molded by, for example, heat-pressing a rubber composition containing a base rubber, a crosslinking initiator, and a co-crosslinking agent.

As the base rubber, typically preferred is the high cis-polybutadiene having cis-1,4-bond in a proportion of 40% or more, more preferably 70% or more, even more preferably 90% or more in view of its superior repulsion property. The co-crosslinking agent includes; for example, an α,β-unsaturated carboxylic acid having 3 to 8 carbon atoms or a metal salt thereof, more preferably a metal salt of acrylic acid or methacrylic acid. As the metal constituting the metal salt, for example, zinc, magnesium, calcium, aluminum and sodium may be used, and among them, zinc is preferred. The amount of the co-crosslinking agent to be used is preferably 20 parts or more, and is preferably 50 parts or less. As the crosslinking initiator, an organic peroxide is preferably used. Examples of the organic peroxide for use in the present invention are dicumyl peroxide, 1,1-bis(t-butylperoxy)-3,3,5-trimethylcyclohexane, 2,5-dimethyl-2,5-di(t-butylperoxy)hexane, and di-t-butyl peroxide. Among them, dicumyl peroxide is preferable. An amount of the crosslinking initiator to be blended in the rubber composition is preferably 0.2 part by mass or more, more preferably 0.3 part by mass or more, and is preferably 3 parts by mass or less, more preferably 2 parts by mass or less based on 100 parts by mass of the base rubber. The core rubber composition may further contain an organic sulfur compound. As the organic sulfur compound, diphenyl disulfides or thiophenols may be preferably used. The amount of the organic sulfur compound is preferably 0.1 part by mass or more, more preferably 0. 3 part by mass or more, and is preferably 5.0 parts by mass or less, more preferably 3.0 parts by mass or less with respect to 100 parts by mass of the base rubber.

The core rubber composition may further contain a weight adjusting agent such as zinc oxide or barium sulfate, an antioxidant, or a colored powder in addition to the base rubber, the crosslinking initiator, the co-crosslinking agent and the organic sulfur compound. The conditions for press-molding the core rubber composition should be determined appropriately depending on the rubber composition. The press-molding is preferably carried out for 10 to 60 minutes at the temperature of 130° C. to 200° C. or the press-molding is preferably carried out in a two-step heating, for example, for 20 to 40 minutes at the temperature of 130° C. to 150° C., and continuously for 5 to 15 minutes at the temperature of 160° C. to 180° C.

In the case that the golf ball of the present invention is a multi-piece golf ball including a three-piece golf ball, the material for the intermediate layer disposed between the core and the cover includes a thermoplastic resin such as a polyurethane resin, an ionomer resin, a polyamide resin, and polyethylene; and a thermoplastic elastomer such as a styrene elastomer, a polyolefin elastomer, a polyurethane elastomer, a polyester elastomer; and a cured product of a rubber composition. Herein, examples of the ionomer resin include one prepared by neutralizing at least a part of carboxyl groups in a copolymer composed of ethylene and an α,β-unsaturated carboxylic acid with a metal ion, and one prepared by neutralizing at least a part of carboxyl groups in a terpolymer composed of ethylene, an α,β-unsaturated carboxylic acid and an α,β-unsaturated carboxylic acid ester with a metal ion. The intermediate layer may further contain a specific gravity adjusting agent such as barium sulfate, tungsten and the like, an antioxidant, and a pigment.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Measurement of Coefficient of Friction

A coefficient of friction of golf balls was measured using a contact force tester 1 shown in FIG. 1.

1. Specification of Measuring Apparatus
   (A) Launcher: air gun system
   (B) Collisional plate:
   base plate 4a
      Steel
      Thickness: 5.35 mm
   Superficial plate 4c
      Main body 4c1
         Size: 56 mm×56 mm×15 mm
         Stainless steel (SUS-630)
      Superficial material 4c2
         Size: 56 mm×56 mm×2.5 mm
         Metal composition: SUS-431
         Groove structure: see FIG. 5
   Angle of inclination ($\alpha$)
      35 degrees (with respect to flying direction of golf ball)
   (C) Pressure sensor 4b
      A 3-component force sensor (model 9607) available from Kistler Instrument Corp.
   Charge amplifier
      Model 5011B available from Kistler Instrument Corp.
   (D) Capture of contact force into PC
      A pulse counter board PCI-6101 (manufactured by INTERFACE CORPORATION) was used. With a 16-bit PCI pulse counter board having 4 channels, measurement suited for a specific application may be realized in four counter modes. The maximum input frequency is 1 MHz.

Figure 5:
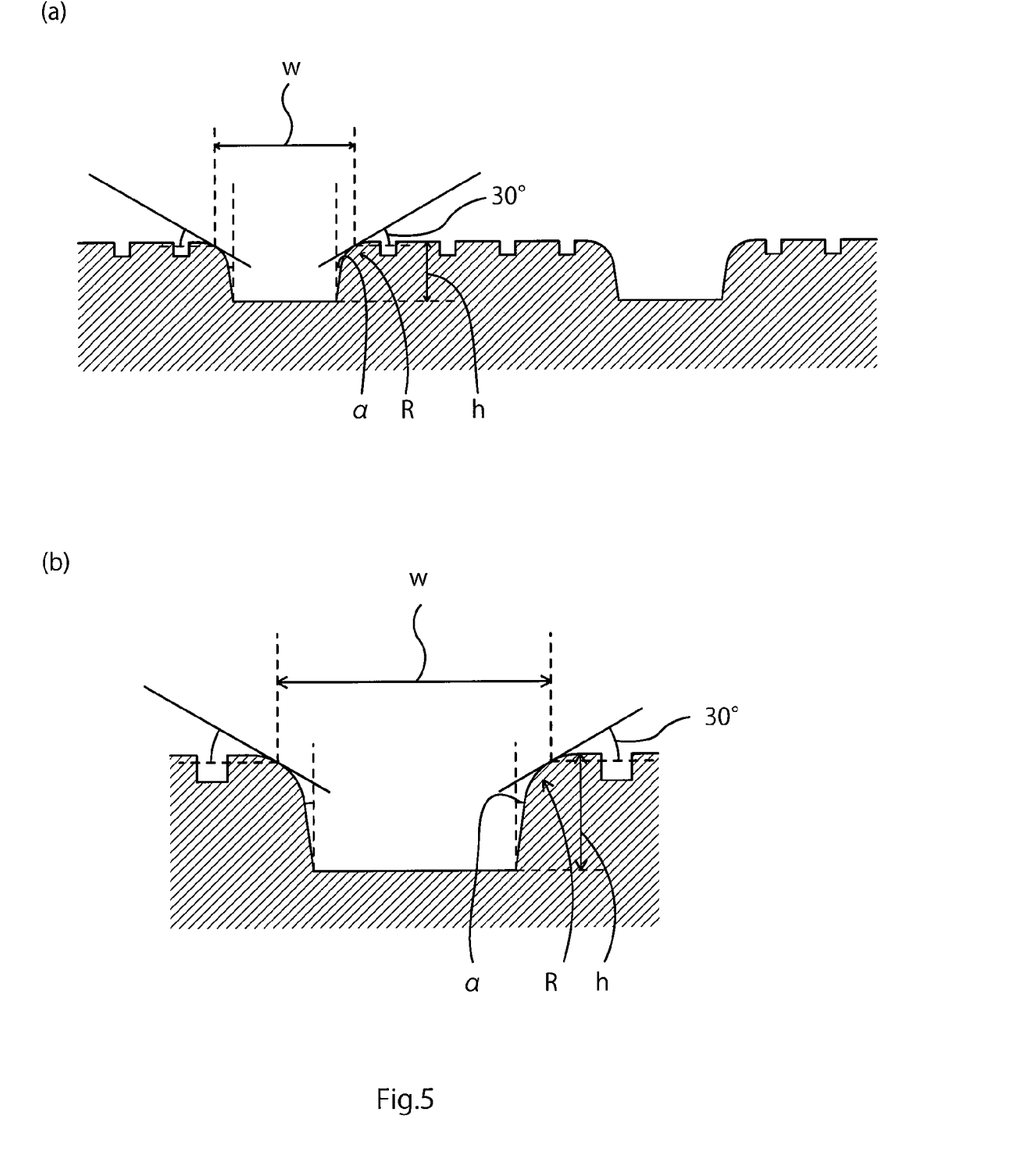
FIG. 5 is a cutaway view of a groove shape of a superficial material of the contact force tester.

As shown in FIG. 5, the groove structure of a sand wedge CG-15 available from Cleveland Golf is reproduced on the striking face 3 of the collisional plate 4. As shown in FIG. 5(*a*), on the striking face 3, large grooves (zip grooves) are formed, and a plurality of small grooves are formed on the surface between the large grooves (zip grooves). FIG. 5(*b*) is an enlarged view of cross-section structure of the zip grooves. The dimensions of the zip grooves are as follow.
   Zip groove (groove) width W: 0.70 mm
   Zip groove (groove) depth h: 0.50 mm
   Zip groove (groove) pitch: 3.56 mm
   Zip groove (groove) angle $\alpha$: 10°
   Zip groove shoulder R: 0.25

A plurality of small grooves between Zip grooves are formed by a laser-milling method so that the surface portion between Zip grooves have surface roughness Ra=2.40±0.8 µm and Rmax=14.0±8 µm. It is noted that the surface roughness Ra and Rmax can be measured with SJ-301 manufacture by Mitsutoyo Corporation under the conditions of the specimen length=2.5 mm and cut off value=2.5 mm.

2. Measuring Procedure
   Measurement of a coefficient of friction was conducted in the following manner.
      (a) Set the angle ($\alpha$) of the collisional plate at 35 degrees to the flying direction (vertical direction) of the golf ball.
      (b) Adjust air pressure of the launcher 5.
      (c) Launch the golf ball from the launcher.
      (d) Measure the initial velocity of the golf ball from the preset distance between the sensor 1 and sensor 2 and the time difference between the times for the golf ball to interrupt the sensors 1 and 2.
      (e) Measure the contact force Fn(t) and contact force Ft(t), and calculate maximum value of Ft(t)/Ft(t).
      (f) Measure a spin rate of the golf ball with the strobe device and camera device.

Figure 6:
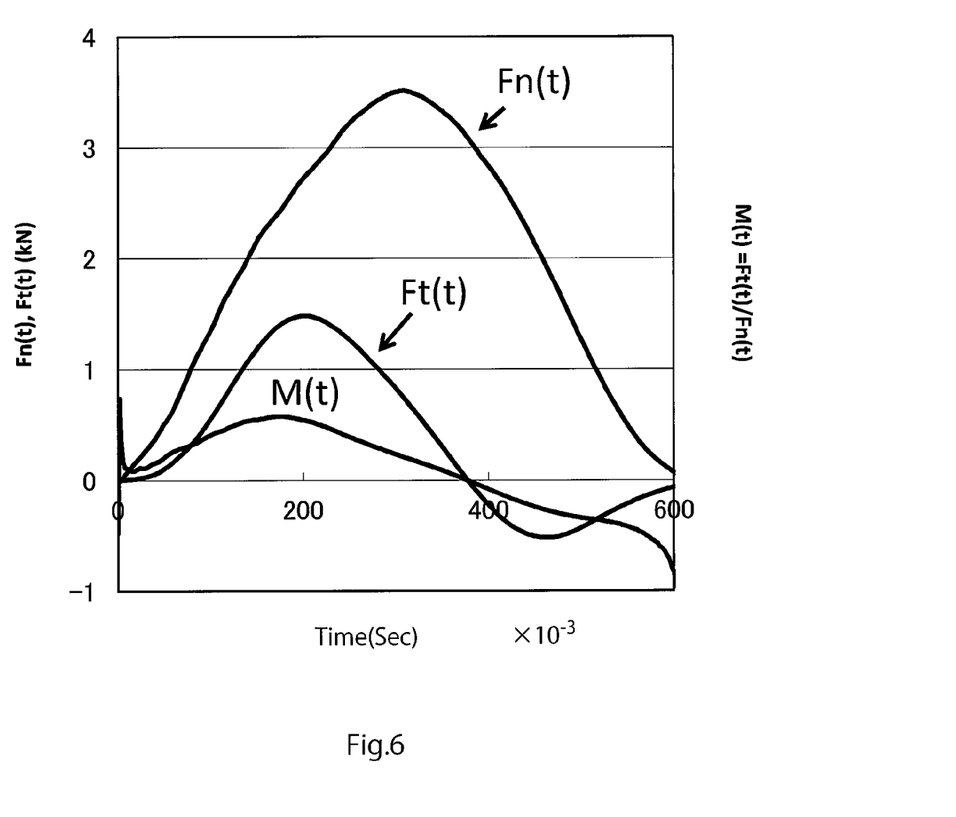
FIG. 6 is a graph illustrating Ft(t), Fn(t), and M(t)

3. Result of Measurement
   An example of the results obtained with the tester in the above measuring procedure is shown in FIG. 6. From FIG. 6, a value of M(t) was calculated as Ft(t)/Fn(t), a maximum value was 0.58. Since noises tends to generate in initial period where contact force rises up and terminal period for measuring Ft and Fn, a maximum value of M(t) is calculated after trimming an early stage of the initial period and late stage of the terminal period.

(2) Martens Hardness of the Paint Film

The martens hardness was measured using Nano indenter "ENT-2100" available from ELIONIX. INC. The measuring conditions are as follows.
   Load F: 20 mgf
   Angle $\alpha$ of Berkovich indenter: 65.03°
   Material of Berkovich indenter: $SiO_2$
   Based on the depth (h) of indentation and angle ($\alpha$) of indenter, an area As(h) can be calculated by the following expression.

$$As(h)=3\times 3^{1/2}\times\tan\alpha/\cos\alpha\times h^2$$

Based on the load F and area As(h), the martens hardness can be calculated by the following expression.

$$\text{Martens Hardness}=F/As(h)$$

Measuring Sample: The base material and curing agent were blended to prepare a paint. The paint was dried and cured at 40° C. for 4 hours to prepare a paint film having a thickness of 100 µm. This paint film was used for the measurement of the martens hardness.

(3) Mechanical Properties of the Paint Film

The base material and curing agent were blended to prepare a paint. The paint was dried and cured at 40° C. for 4 hours to prepare a paint film. This paint film was punched out in a dumbbell shape to prepare test pieces. The mechanical properties of the paint film were measured using a tensile tester manufactured by SHIMAZU CORPORATION. The modulus at 10% elongation, 50% elongation and 100% elongation were calculated. In the case of blending an additive such as a filler, the mechanical properties of the paint film containing the additive were measured.
   Thickness of Test piece: 0.05 mm
   Crosshead Speed: 50 mm/min.

(4) Shot Feeling

An actual hitting test was carried out by ten amateur golfers (high skilled person) using a sand wedge (CG 15 forged wedge available from Cleveland Golf). In accordance with the number who answered the shot feeling was good (feeling like that the golf ball was lifted on the club face, feeling like that the golf ball gripped on the club surface, feeling like that the spin is imparted, feeling like that the golf ball was stuck on the club face, etc.), the golf balls were evaluated as follows.
   E (Excellent): 8 or more
   G (Good): 4 to 7
   P (Poor): 3 or less

[Production of the Golf Ball]

(1) Preparation of Center

The center rubber composition having formulation shown in Table 1 was kneaded and pressed in upper and lower molds, each having a hemispherical cavity, at a temperature of 170° C. for 20 minutes to obtain the center in a spherical shape (diameter 39.3 mm).

TABLE 1

| Center rubber composition | Parts by mass |
| --- | --- |
| Polybutadiene rubber | 100 |
| Zinc acrylate | 35 |
| Zinc oxide | 5 |
| Barium sulfate | Appropriate amount*) |
| Diphenyl disulfide | 0.5 |
| Dicumyl peroxide | 0.9 |

Notes on table 1:
*)Depending on the cover composition, adjustment was made such that the golf ball had a mass of 45.3 g.
Polybutadiene rubber: "BR730 (high cis-polybutadiene)" manufactured by JSR Corporation
Zinc acrylate: "ZNDA-90S" manufactured by NIHON JYORYU KOGYO Co,. LTD.
Zinc oxide: "Ginrei R" manufactured by Toho-Zinc Co.
Barium sulfate: "Barium Sulfate BD" manufactured by Sakai Chemical Industry Co., Ltd.
Diphenyl disulfide: manufactured by Sumitomo Seika Chemicals Company Limited
Dicumyl peroxide: "Percumyl D" manufactured by NOF Corporation (2) Preparation of the Intermediate Layer Composition and Cover Composition The materials shown in Tables 2 and 3 were mixed using a twin-screw kneading extruder to obtain the intermediate layer composition and cover composition in the form of pellet. The extrusion was conducted in the following conditions: screw diameter=45 mm, screw revolutions=200 rpm, and screw L/D=35. The blended materials were heated to from 200° C. to 260° C. at the die position of the extruder.

TABLE 2

| Intermediate layer composition | Formulation (parts by mass) |
| --- | --- |
| Surly 8945 | 55 |
| Himilan AM7329 | 45 |
| Titanium dioxide | 4 |

Note on table 2
Surlyn 8945: Sodium ion neutralized ethylene-methacrylic acid copolymer ionomer resin available from E. I. du Pont de Nemours and Company
Himilan AM7329: Zinc ion neutralized ethylene-methacrylic acid copolymer ionomer resin available from Du Pont-Mitsui Polychemicals Co., Ltd

TABLE 3

| Cover composition | Formulation (Parts by mass) |
| --- | --- |
| Elastollan XNY85A | 100 |
| Titanium dioxide | 3 |
| Ultramarine blue | 0.04 |
| Slab hardness(Shore D) | 32 |

Formulation: parts by mass
Elastollan XNY85A: a thermoplastic polyurethane elastomer manufactured by BASF Japan Ltd. (Shore D: 32)

(3) Preparation of Spherical Core

The obtained intermediate layer composition was injection molded on the center obtained as described above to produce the spherical core composed of the center and the intermediate layer covering the center. Upper and lower molds for molding have a spherical cavity with pimples, a part of which serves as a hold pin which is extendible and retractable. When molding the intermediate layer, the hold pins were protruded to hold the center after the center was put in, the intermediate layer composition heated to 260° C. was charged into the mold under a pressure of 80 tons within 0.3 seconds, and cooled for 30 seconds. Then, the mold was opened, and the spherical cores were taken out from the mold.

(4) Molding of Half Shells

Compression molding of half shells was conducted by, charging one pellet of the cover composition obtained as described above into each of depressed parts of lower molds for molding half shells, and applying pressure to mold half shells. Compression molding was conducted at a temperature of 170° C. for 5 minutes under a molding pressure of 2.94 MPa.

(5) Molding of the Cover

The core obtained in (3) was covered with the two half shells obtained in (4) in a concentric manner, and the cover was molded by compression molding. Compression molding was conducted at a temperature of 145° C. for 2 minutes under a molding pressure of 9.8 MPa.

(6) Preparation of Paint

The polyol and the polyisocyanate shown in Tables 4 and 5 were blended to prepare paints. The base resin was prepared by using a mixed solvent of MEK and toluene to have the polyol component content of 30 mass %. The curing agent was prepared by using a mixed solvent of MEK, n-butyl acetate and toluene as a solvent to have the polyisocyanate component content of 60 mass %.

(7) Formation of Paint Film

Figure 7:
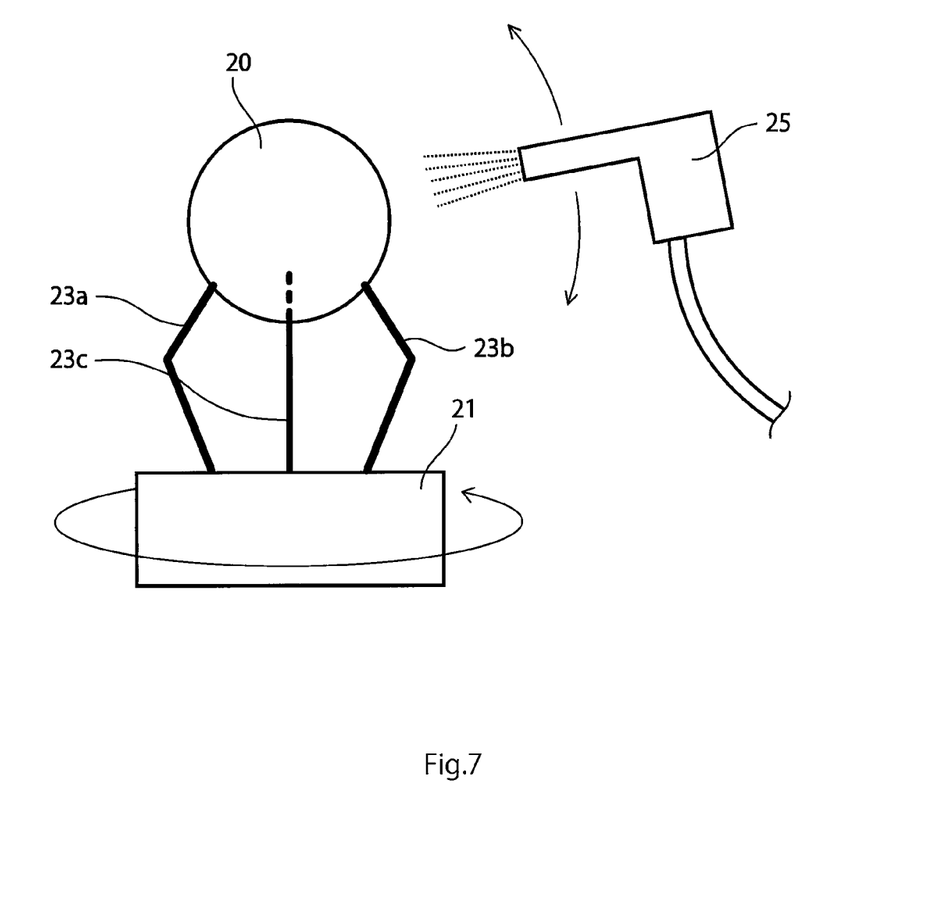
FIG. 7 is a schematic view illustrating an embodiment of applying the paint with an air gun.

The surfaces of the golf ball bodies obtained in (5) were subjected to the sandblast treatment, and the marks were formed. Then, the paints were applied to the golf ball bodies with the spray-gun, and the paints were dried in the oven heated at 40° C. for 24 hours to prepare the golf balls having a diameter of 42.7 mm and a mass of 45.3 g. The thickness of the paint film was 20 µm. The application of the paint was conducted as follows. The golf ball bodies 20 were placed in the rotating member 21 (23a to 23b: prong) shown in FIG. 7, which rotated at 300 rpm. The application of the paint was conducted by spacing a spray distance (7 cm) between the air gun 25 and the golf ball body 20 while moving the air gun 25 in a up and down direction. The painting interval in the overpainting operation was set to 1.0 second. Application of the paint was conducted under the spraying conditions of spraying air pressure: 0.15 MPa, compressed air tank pressure: 0.10 MPa, and painting time per one application: 1 second, atmosphere temperature: 20° C. to 27° C., and atmosphere humidity: 65% or less. The results of the spin rates of the obtained golf balls were also shown in Tables 4 and 5.

TABLE 4

| | | Golf ball No. | 1 | 2 | 3 | 4 | 5 | 6 | 7 | 8 | 9 | 10 |
| --- | --- | --- | --- | --- | --- | --- | --- | --- | --- | --- | --- | --- |
| Paint Formulation | Curing agent *2) | Biuret-modified HDI/ HDI isocyanurate | 30/30 | 30/30 | 30/30 | 45/45 | 40/40 | 25/25 | 15/15 | 5/55 | 20/40 | 40/20 |
| | | IPDI component (IPDI isocyanurate) | 40 | 40 | 40 | 10 | 20 | 50 | 70 | 40 | 40 | 40 |
| | | Curing agent/base resin (NCO/OH mole ratio) | 0.2/1.0 | 0.38/1.0 | 0.5/1.0 | 0.5/1.0 | 0.5/1.0 | 0.5/1.0 | 0.5/1.0 | 0.5/1.0 | 0.5/1.0 | 0.5/1.0 |

TABLE 4-continued

|  |  | Golf ball No. | 1 | 2 | 3 | 4 | 5 | 6 | 7 | 8 | 9 | 10 |
|---|---|---|---|---|---|---|---|---|---|---|---|---|
| Paint film Properties | Coefficient of Friction | | 0.55 | 0.46 | 0.42 | 0.63 | 0.54 | 0.41 | 0.33 | 0.61 | 0.44 | 0.39 |
| | Martens Hardness (mgf/μm²) | | 0.09 | 0.14 | 0.25 | 0.07 | 0.09 | 0.51 | 3.70 | 0.07 | 0.15 | 1.80 |
| | 100% elastic modulus (kgf/cm²) | | 16 | 22 | 90 | 10 | 16 | 100 | *1) | 10 | 40 | 160 |
| | 50% elastic modulus (kgf/cm²) | | 12 | 14 | 58 | 10 | 12 | 80 | 190 | 10 | 24 | 130 |
| | 10% elastic modulus (kgf/cm²) | | 5 | 8 | 38 | 2 | 5 | 60 | 165 | 2 | 20 | 100 |
| Properties | Spin rate (rpm) | | 5500 | 5600 | 5500 | 5100 | 5500 | 5400 | 4800 | 5100 | 5550 | 5350 |
| | Shot feeling | | E | E | E | G | E | E | G | G | E | E |

*1) Elongation: less than 100%
*2) Curing agent formulation: mass ratio

TABLE 5

|  |  | Golf ball No. | 11 | 12 | 13 | 14 | 15 |
|---|---|---|---|---|---|---|---|
| Paint Formulation | Curing agent | Biuret-modified HDI/HDI isocyanurate | 50/10 | 30/30 | 30/30 | 30/30 | 30/30 |
| | | IPDI component (IPDI isocyanurate) | 40 | 40 | 40 | 40 | 40 |
| | | Curing agent/base resin (NCO/OH mole ratio) | 0.5/1.0 | 0.8/1.0 | 1.0/1.0 | 1.2/1.0 | 1.6/1.0 |
| Paint film Properties | Coefficient of Friction | | 0.33 | 0.38 | 0.35 | 0.32 | 0.28 |
| | Martens Hardness (mgf/μm²) | | 3.90 | 2.80 | 3.60 | 4.30 | 6.50 |
| | 100% elastic modulus (kgf/cm²) | | *1) | 201 | 240 | 279 | *1) |
| | 50% elastic modulus (kgf/cm²) | | 199 | 148 | 180 | 209 | 251 |
| | 10% elastic modulus (kgf/cm²) | | 175 | 126 | 160 | 186 | 275 |
| Properties | Spin rate (rpm) | | 4800 | 5250 | 5000 | 4700 | 4450 |
| | Shot feeling | | G | E | G | G | P |

*1) Degree of elongation: less than 100%
*2) Curing agent formulation: mass ratio Material used in Tables 4 and 5 are follows.
Base Resin
Polin #950 available from SHINTO PAINT: urethane polyol with a hydroxyl value of 128 mgKOH/g, and composed of the polyol component (trimethylolpropane and polytetramethylene ether glycol) and the polyisocyanate component (isophorone diisocyanate)
Curing Agent
Isocyanurate of hexamethylene diisocyanate: Duranate TKA-100 (NCO content: 21.7%) available from Asahi Kasei Corporation
Biuret-modified product of hexamethylene diisocyanate: Duranate 21S-75E (NCO content: 15.5%) available from Asahi Kasei Corporation
Isocyanurate of isophorone diisocyanate: VESTANAT T1890 (NCO content: 12.0%) available from Degussa As shown in Tables 4 and 5, the golf balls comprising a golf ball body and a paint film formed on s surface of the golf ball body and having a coefficient of friction measured using a contact force tester of 0.35 or more and 0.60 or less of the present invention have a high spin rate and good shot feeling.

The present invention is useful for painted golf balls. This application is based on Japanese Patent applications No. 2012-21886 filed on Feb. 3, 2012 and No. 2012-136294 filed on Jun. 15, 2012, the contents of which are hereby incorporated by reference.

The invention claimed is:

1. A golf ball comprising a golf ball body and a paint film formed on a surface of the golf ball body, and having a coefficient of friction calculated using a contact force tester of 0.35 or more and 0.60 or less, wherein
the paint film is formed from a base resin which is a polyurethane obtained by a reaction between a polyol and two or more polyisocyanates,
a molar ratio (NCO/OH) of the isocyanate groups (NCO) of the two or more polyisocyanates to the hydroxyl groups (OH) of the polyol is 0.1 or more and 0.9 or less in the reaction between the two or more polyisocyanates and the polyol,
the polyol includes a urethane polyol obtained by a reaction between a polyol component and a polyisocyanate component,
the polyol component constituting the urethane polyol includes a triol component and a diol component, and a mixing ratio (triol component/diol component) of the triol component to the diol component is 0.2 or more and 6.0 or less in mass ratio,
the two or more polyisocyanates include a derivative of hexamethylene diisocyanate and a derivative of isophorone diisocyanate,
a mixing ratio of the derivative of hexamethylene diisocyanate and the derivative of isophorone diisocyanate (HDI derivative /IPDI derivative) ranges from 80/20 to 50/50 in a mass ratio, and
the paint film has a thickness of 10 μm or more and less than 30 μm.

2. The golf ball according to claim 1, wherein the derivative of hexamethylene diisocyanate includes a biuret-modified product of hexamethylene diisocyanate and isocyanurate of hexamethylene diisocyanate.

3. The golf ball according to claim 1, wherein the derivative of isophorone diisocyanate includes isocyanurate of isophorone diisocyanate.

4. The golf ball according to claim 1, wherein the paint film has a 100% elastic modulus of 15 kgf/cm² or more and 240 kgf/cm² or less.

5. The golf ball according to claim 1, wherein the paint film has a 50% elastic modulus of 10 kgf/cm² or more and 180 kgf/cm² or less.

6. The golf ball according to claim 1, wherein the paint film has a 10% elastic modulus of 5 kgf/cm² or more and 160 kgf/cm² or less.

7. The golf ball according to claim 1, wherein the paint film has the coefficient of friction of 0.37 or more and 0.56 or less.

8. The golf ball according to claim 1, wherein the paint film has the coefficient of friction of 0.39 or more and 0.54 or less.

9. The golf ball according to claim 1, wherein the derivative of hexamethylene diisocyanate includes a biuret-modified product of hexamethylene diisocyanate and isocyanurate of hexamethylene diisocyanate, and the derivative of isophorone diisocyanate includes isocyanurate of isophorone diisocyanate.

10. The golf ball according to claim 1, wherein the molar ratio (NCO/OH) of the isocyanate groups (NCO) of the two or more polyisocyanates to the hydroxyl groups (OH) of the polyol is 0.1 or more and 0.8 or less.

11. The golf ball according to claim 9, wherein the molar ratio (NCO/OH) of the isocyanate groups (NCO) of the two or more polyisocyanates to the hydroxyl groups (OH) of the polyol is 0.1 or more and 0.8 or less.

\* \* \* \* \*